Patented Jan. 25, 1949

2,459,987

UNITED STATES PATENT OFFICE 2,459,987

MIXED SILICA-ALUMINA, SILICA-MAGNESIA CATALYST

Julius P. Bilisoly, Baton Rouge, La., assignor to Standard Oil Development Company, a corporation of Delaware No Drawing. Application May 7, 1946, Serial No. 668,007

1 Claim. (Cl. 252—455)

The present invention is concerned with an improved process for the preparation of a superior catalyst. It is more particularly concerned with an improved process for the preparation of a cracking catalyst, comprising mixtures of silica-magnesia and silica-alumina. In accordance with my invention the improved catalyst is prepared by mixing silica magnesia with silica-alumina hydrogel, or with silica-alumina in the dry state.

It is well known in the art to employ various catalysts for the treatment of petroleum oils. For example, in the cracking of petroleum oils particularly desirable catalysts comprise silica-alumina catalysts. These silica-alumina hydrogel catalysts have been prepared by various procedures which are known in the art. One method employed is to add a 25 Bé. sodium silicate solution to a dilute sulfuric acid solution while stirring. The resulting sol is allowed to set to a hydrogel over a period of from about ½ to 24 hours. The hydrogel is then broken into rough pieces and washed by water displacement to low soda and sulphate contents. The relatively pure silica hydrogel (the Na2O content is usually less than 0.1% and the SO4 content less than 0.5%) is then covered with a concentrated solution of aluminum sulphate of approximately 19° Bé. and allowed to soak for about ½ hour. After this the excess aluminum sulphate solution is drained off and the resulting aluminum sulphate impregnated silica hydrogel is treated with a 3.5% aqueous solution of ammonia to a pH of about 4 whereby the alumina is precipitated in the silica hydrogel. The resulting silica-alumina hydrogel is washed by water displacement to a relatively low sulphate content, and dried.

Another method for the preparation of the silica-alumina catalyst is to employ "the impregnation at the mix" process. In this process the aluminum salt is added to the silica hydrosol before the latter sets to a hydrogel. In this process ammonia solution is added both to neutralize the excess acidity of the silica hydrogel and to precipitate the alumina. The setting of the hydrogel is also accomplished in organic solvents such as various petroleum solvents, light gas oil, lubricating oils, butanol, etc., and other mediums of a similar nature which are immiscible with water. Such mediums are especially useful for the production of the silica-alumina catalysts in the form of spheres. In general, the aluminum contents of these hydrous alumina-silica catalysts prepared in the manner described and known in the art vary in the range from about 5% to about 50%.

While catalysts of this character are undoubtedly superior in many respects to other catalysts for the cracking of petroleum oils, their activity is adversely effected when treated with steam for the regeneration of the same. Various proposals and attempts have been made to overcome this difficulty.

I have now discovered catalysts (and methods for their preparation), which are relatively steam stable. My catalysts are in effect, combinations of silica-magnesia and silica-alumina catalysts.

The silica-magnesia catalyst, used as a component of the catalyst of my invention, may be prepared by any satisfactory procedure. One method is to mull together 25% to 35% (dry basis) of a heavy magnesium oxide with silica hydrogel and water and to activate the silica-magnesia catalyst by heating at 850° F., and then at 1250° F. This material is mixed with a separately prepared silica-alumina catalyst either in the dry, or in the hydrogel state.

The silica-alumina catalyst likewise may be prepared by any suitable procedure. The silica-alumina catalyst contains from about 5% to 50% alumina and may be satisfactorily prepared by impregnation of silica hydrogel as previously described. In some instances it is possible to use catalysts containing as high as 65% alumina. However, those in the alumina range cited are more commonly used.

The amount of silica-magnesia employed as compared to the silica-alumina, may vary widely, as for example, in the range from 10 to 90%, depending upon the ends to be gained and the mode of preparation desired. I may use from about 40 to 50% of silica-alumina as compared to about 60 to 40% of silica-magnesia. However, preferred cracking catalysts of greatly improved stability towards deactivation by steam are composed of mixtures of 80 to 85% of a silica-magnesia catalyst (containing approximately 30 to 35% magnesia) and 15 to 20% of a high alumina, silica-alumina catalyst (containing 30 to 65% alumina). It is preferred that the alumina content of the silica-alumina catalyst be in the range from about 50% to 65%.

Such a catalyst is prepared by admixture of a silica-magnesia catalyst of the composition cited above, either in the wet or dry state, with a previously prepared high alumina, silica-alumina catalyst in the hydrogel state.

A preferred method of preparing the catalyst of the present invention is as follows. Mix about 25% to 30% of a calcined heavy magnesia with 70% to 75% (dry basis) of a previously prepared silica-alumina catalyst in the hydrogel state. The hydrogel contains approximately 12½% of alumina, and water. The heavy magnesia is thoroughly mixed, by means of suitable mixing or contacting devices, with the silica-alumina hydrogel for a sufficient time period to assure thorough and intimate mixing. By this process the magnesia removes and ties up a portion of the silica, thereby leaving an intimate intermingled mixture of a silica-magnesia catalyst, and a silica-alumina catalyst of high alumina content. My catalyst, prepared in this manner, has a structure which gives to the catalyst properties different from catalyst properties known in the art.

My invention may be more readily understood by the following examples given for the purpose of illustrating the same.

EXAMPLE I

70% of a silica-alumina hydrogel, (12.5% alumina), when mixed as described with 30% of magnesia will result in the following catalyst:

ORIGINAL MIXTURE

|  | Per cent |  | Grams |
|---|---|---|---|
| Magnesia | 30 |  |  |
| Silica-Alumina | 70 | Alumina | 8.7 |
|  |  | Silica | 61.3 |
|  | 100 |  | 70 |

Magnesia combines with silica from the hydrogel to form a 35% magnesia product.

|  | Per cent | Grams |
|---|---|---|
| Magnesia | 35 | 30 |
| Silica | 65 | 55.7 |
|  | 100 | 85.7 |

Remaining silica-alumina hydrogel is as follows:

|  | Grams | Per cent |
|---|---|---|
| Alumina | 8.8 | 61.2 |
| Silica | 5.5 | 38.8 |
|  | 14.3 | 100 |

The catalyst possesses superior properties for the cracking of petroleum oils.

EXAMPLE II

75% of a silica-alumina hydrogel, (12.5% alumina) when mixed as described with 25% of magnesia, will result in the following catalyst:

ORIGINAL MIXTURE

|  | Per cent |  | Grams |
|---|---|---|---|
| Magnesia | 25 |  |  |
| Silica-Alumina | 75 | Alumina | 9.4 |
|  |  | Silica | 65.6 |
|  | 100 |  | 75 |

Magnesia combines with silica from the hydrogel to form a 35% magnesia product.

|  | Per cent | Grams |
|---|---|---|
| Magnesia | 35 | 25 |
| Silica | 65 | 46.4 |
|  | 100 | 71.4 |

Remaining silica-alumina hydrogel is as follows:

|  | Grams | Per cent |
|---|---|---|
| Alumina | 9.38 | 32.8 |
| Silica | 19.22 | 67.2 |
|  | 28.60 | 100 |

This catalyst likewise possesses superior properties for the cracking of petroleum oils.

EXAMPLE III

The catalyst prepared in accordance with Example I was utilized to crack a petroleum gas oil boiling in the range from about 400° F. to 700° F.

*In Operation I.*—a conventional silica-alumina catalyst was employed and compared with results when utilizing the catalyst of the present invention. Both catalysts were treated at a temperature of 1250° F.

*In Operation II.*—a conventional silica-alumina catalyst was employed and compared with results when utilizing the catalyst of the present invention. Both catalysts were treated at a temperature of 1400° F.

*In Operation III.*—a conventional silica-alumina catalyst was employed and compared with results when utilizing the catalyst of the present invention. Both catalysts were steamed for 24 hours at 1050° F. and at a pressure of 60 lbs. per sq. in. gauge.

The results of these respective operations are summarized in the following table:

|  | Operation I, 1250° F. | | | Operation II, 1400° F. | | Operation III, Steamed [1] | |
|---|---|---|---|---|---|---|---|
|  | $D+L$ | Carbon | Oct. No. Gaso. | $D+L$ | Carbon | $D+L$ | Carbon |
| Silica-Alumina Catalyst—Approx. 12.5% $Al_2O_3$ | 55 | 5.5 | 89 | 48 | 3.6 | 27 | 1 |
| Catalyst Example I—30% MgO, 70% Silica-Alumina | 57 | 5.9 | 83 | 46 | 3.4 | 51 | 4 |

[1] 24 hours, 1050° F., 60 p. s. i. g.

The $D+L$ (distillation plus loss, Engler) shows the amount of hydrocarbon constituents produced from the cracking operation boiling below 400° F.

It is evident that the catalyst of the present invention is superior, particularly with respect to its steam stability.

Although it is preferred to use mixtures comprising 80 to 85% of a silica-magnesia catalyst F. with catalyst described above. The results of these operations are summarized in Table II.

Table II

| Catalyst | Activity Test at 850° F. | | | | | Activity Test D+L After Steaming [3] | | | | | Diff. D+L | Diff. Per Cent |
|---|---|---|---|---|---|---|---|---|---|---|---|---|
| | Gas Den. | Wt. Gas | D+L | Carbon | Oct. No. | Gas Den. | Wt. Gas | Carbon | D+L | Calculated | | |
| (1) Silica-Magnesia | 0.80 | 8.8 | 54.5 | 4.7 | 83.8 | 0.72 | 5.2 | 2.7 | 42.0 | | | |
| (2) Silica-Alumina (13.5% Al₂O₃) | 1.00 | 10.0 | 55.0 | 5.5 | 89.2 | 0.94 | 3.5 | 1.0 | 27.0 | | | |
| (3) Silica-Alumina (14.8% Al₂O₃) | | | | | | 0.85 | 3.8 | 0.7 | 30.0 | | | |
| 50/50—(1)+(2) wet [1] | 1.00 | 8.8 | 53.5 | 4.8 | 87.2 | 0.98 | 4.8 | 1.7 | 37.5 | 34.5 | +3.0 | +8.7 |
| 50/50—(1)+(2) dry [2] | 0.92 | 8.3 | 56.0 | 4.9 | 86.8 | 0.85 | 4.3 | 2.1 | 41.0 | 34.5 | +6.0 | +17.4 |
| 50/50—(1)+(3) dry | 0.92 | 8.8 | 56.0 | 5.7 | | 0.81 | 6.6 | 3.0 | 39.5 | 36.0 | +4.0 | +11.1 |
| 80/20—(1)+(3) dry | | | | | | 0.70 | 7.3 | 3.5 | 41.0 | 39.5 | +1.5 | +3.8 |
| 80/20—(1)+(2) dry | 0.82 | 8.6 | 55.0 | 5.2 | 85.9 | 0.69 | 6.1 | 2.6 | 39.0 | 39.0 | 0.0 | 0.0 |

[1] Wet refers to use of the silica-alumina catalyst as the hydrogel.
[2] Dry refers to use of the silica-alumina catalyst after drying and pulverizing.
[3] 24 hours, 1050° F., 60 p. s. i. g.

(containing approximately 30 to 35% magnesia) and 15 to 20% of a high alumina, silica-alumina catalyst (containing 50 to 65% alumina), my invention contemplates generally the use broadly of from 10 to 90% of silica-magnesia in conjunction with the silica-alumina catalyst. Furthermore, although it is preferred to utilize the silica-alumina hydrogel in the preparation of my catalyst, I also contemplate the use of silica-alumina catalyst in the dry state.

The advantages of these mixtures, especially in the range employing 50% to 80% of the silica-magnesia catalyst and 50% to 20% of the silica-alumina catalyst, are apparent from the following example:

EXAMPLE IV

Various operations were conducted cracking gas oils boiling in the range from 400° F. to 700°

I claim:
Improved cracking catalysts consisting essentially of a mixture of 80–85% silica-magnesia and 20–15% of a separately prepared silica-alumina, said silica-magnesia containing 30–35° magnesia and 70–65% silica, and said silica-alumina containing 50–65% alumina and 50–35% silica.

JULIUS P. BILISOLY.

REFERENCES CITED

The following references are of record in the file of this patent:

UNITED STATES PATENTS

| Number | Name | Date |
|---|---|---|
| 2,216,262 | Bloch et al. | Oct. 1, 1940 |
| Re. 21,690 | Bond, Jr. | Jan. 14, 1941 |
| 2,340,934 | Connolly | Feb. 8, 1944 |